(12) United States Patent
Fournier et al.

(10) Patent No.: US 8,149,099 B2
(45) Date of Patent: Apr. 3, 2012

(54) DIAL SPEED INDICATOR WITH TWO POINTERS INDICATING AN ACTUAL SPEED AND A REFERENCE SPEED

(75) Inventors: Joel Fournier, Cergy (FR); Stephane Voillot, Courdimanche (FR)

(73) Assignee: Johnson Controls Technology Company, Holland, MI (US)

( * ) Notice: Subject to any disclaimer, the term of this patent is extended or adjusted under 35 U.S.C. 154(b) by 630 days.

(21) Appl. No.: 11/660,072

(22) PCT Filed: Jul. 27, 2005

(86) PCT No.: PCT/FR2005/001957
§ 371 (c)(1),
(2), (4) Date: Jun. 11, 2007

(87) PCT Pub. No.: WO2006/024747
PCT Pub. Date: Mar. 9, 2006

(65) Prior Publication Data
US 2007/0252684 A1  Nov. 1, 2007

(30) Foreign Application Priority Data
Aug. 11, 2004 (FR) .................. 04 08822

(51) Int. Cl.
*B60Q 1/00* (2006.01)
*G08B 5/00* (2006.01)
*G08B 5/24* (2006.01)

(52) U.S. Cl. ............... 340/441; 340/815.86; 340/815.87

(58) Field of Classification Search .......... 340/815.86, 340/461
See application file for complete search history.

(56) References Cited

U.S. PATENT DOCUMENTS

| 2,711,153 | A | * | 6/1955 | Wendt | 116/62.3 |
| 2,738,759 | A | * | 3/1956 | Hardesty | 116/286 |
| 2,885,994 | A | * | 5/1959 | Butera | 116/316 |
| 4,380,043 | A | | 4/1983 | Takamatsu et al. | |
| 4,841,902 | A | * | 6/1989 | Gubin | 116/62.4 |
| 6,276,809 | B1 | * | 8/2001 | Matsumoto | 362/26 |
| 6,561,123 | B2 | * | 5/2003 | Kallinke et al. | 116/288 |
| 6,925,959 | B2 | * | 8/2005 | Wehner | 116/286 |
| 6,979,094 | B1 | * | 12/2005 | Venkatram | 362/23 |
| 2001/0035818 | A1 | * | 11/2001 | Kabatek et al. | 340/438 |
| 2002/0108555 | A1 | * | 8/2002 | Breinich et al. | 116/288 |
| 2002/0149495 | A1 | * | 10/2002 | Schach et al. | 340/815.78 |
| 2004/0212977 | A1 | * | 10/2004 | Ishii | 362/23 |

FOREIGN PATENT DOCUMENTS

| DE | 100 26 860 A1 | 12/2001 |
| DE | 101 45 036 A1 | 4/2003 |
| EP | 1445776 A1 * | 8/2004 |
| JP | 55-71985 A | 5/1980 |

OTHER PUBLICATIONS

International Search Report for Application No. PCT/FR2005/001957, date of mailing Dec. 22, 2005, 2 pages.

* cited by examiner

*Primary Examiner* — Benjamin C Lee
*Assistant Examiner* — Cal Eustaquio
(74) *Attorney, Agent, or Firm* — Foley & Lardner LLP

(57) ABSTRACT

An indicator for a vehicle instrument cluster includes a number of pointers concentrically mounted with respect to the instrument cluster. The pointers are illuminated via a common light source. The pointers may be configured to indicate a reference value and an actual measured value (e.g., vehicle speed).

20 Claims, 1 Drawing Sheet

DIAL SPEED INDICATOR WITH TWO POINTERS INDICATING AN ACTUAL SPEED AND A REFERENCE SPEED

CROSS-REFERENCE TO RELATED PATENT APPLICATIONS

The present application is a National Stage of Application PCT/FR2005/001957 entitled, "Dial Speed Indicator with Two Pointers Indicating an Actual Speed and a Reference Speed" filed on Jul. 27, 2005 which published under PCT Article 21(2) on Mar. 9, 2006 as WO 2006/024747 A1 in the French language, which claims priority to French Patent Application No. FR 0408822 filed on Aug. 11, 2004, the disclosures of which are incorporated herein by reference in their entirety.

BACKGROUND

The present application relates to a dial speed indicator, with a second pointer indicating a reference speed.

The dashboard of a motor vehicle usually comprises an instrument panel, located facing the driver, which comprises a group of indicators, in particular a speed indicator, which may have a pointer.

The speed indicator pointer, controlled and rotated by a motor, or movement, usually lies in front of a printed surface carrying reading marks (graduations and speed values, in particular), forming a speed dial. The reading mark surface is called the dial plate. The speed indicator is mounted in a dashboard hood serving as protection and cover and supporting a protective window.

It has become common to want to display a reference speed on the speed dial, whether it be the reference speed of a cruise control or a speed limiter, for example. The driver can thereby read, on the same indicator, the actual speed of the vehicle and the speed to which he has adjusted his engine, or that he must not exceed, in those cases. This reading must be able to be carried out by day as well as by night.

The prior art provides speed indicators in which a series of light-emitting diodes (LED) is placed at the outer edge of the dial, the LED that corresponds to the reference speed being illuminated. Having so many LEDs is however very expensive and considerably increases the cost of the instrument panel. The accuracy of the indication of a speed, which is subdued because of the juxtaposition of the LEDs, is also quite poor.

PCT Publication WO 2001/92047 provides an indicator which includes a first pointer indicating the actual speed of the vehicle, lying in front of the dial plate, and a second pointer, angled, indicating a reference speed and located at the rear of the dial plate, of which only the end of the angled portion can be seen at the outer edge of the dial. The indicator comprises a first light box, at the back of which are mounted, on a first printed circuit board, LEDs for illuminating the dial pointed to by the pointer indicating the actual speed, and a second light box, in which lies the angled pointer, the dial pointed to by this pointer being illuminated by LEDs mounted on a second printed circuit board located at the rear of the second light box, and also carrying a drive motor for the two pointers. This indicator is however very voluminous, due to the depth required for the combination of the two pointers and the means for driving and illuminating. In addition, the pointers are not illuminated.

SUMMARY

Therefore, it is desirable to provide a dial speed indicator, with a second pointer indicating a reference speed, which is both compact and inexpensive.

One exemplary embodiment relates to a speed indicator, including a dial plate supporting a dial; a first pointer indicating the actual speed, rotated in front of the dial; a second pointer indicating a reference speed, rotated behind the dial and including an end portion visible at the outer edge of the dial; and means for illuminating the first and second pointers and the dial. The means for illuminating comprises a single source of illumination common to the first pointer, the second pointer and the dial.

Another exemplary embodiment relates to a speed indicator including a dial plate supporting a dial and a first pointer indicating a first speed. The first pointer is configured to rotate in front of the dial. A second pointer indicates a second speed. The first pointer is configured to rotate behind the dial and the second pointer includes an end portion visible at the outer edge of the dial. A light source is configured to illuminate the first pointer, second pointer and the dial.

In another exemplary embodiment, an indicator for a vehicle instrument cluster, includes an electric motor; a plurality of pointers concentrically mounted with respect to the instrument cluster; a plurality of drive shafts connecting the pointers to the electric motor; a dial mounted between at least two pointers in the plurality of pointers; a first light box attached to the dial and configured to at least partially conceal the light in at least one pointer; and a light source configured to provide light to the plurality of pointers.

BRIEF DESCRIPTION OF THE FIGURES

The invention will be better understood with the help of the following description of the provided embodiment of the inventive indicator, with reference to the attached drawings, in which.

DETAILED DESCRIPTION OF THE EXEMPLARY EMBODIMENTS

The present application relates to a speed indicator, comprising a dial plate supporting a dial, a first pointer indicating the actual speed, rotated in front of the dial, a second pointer indicating a reference speed, rotated behind the dial and including an end portion visible at the outer edge of the dial, and means for illuminating the two pointers and the dial, which indicator is characterized in that the illuminating means comprises a single source of illumination common to both pointers and the dial.

A compact and inexpensive speed indicator can be provided, by which both pointers are illuminated.

The support for the dial is mounted on a light pipe mounted in a first light box, the first indicating pointer is light-transmitting, the second indicating pointer is light-transmitting, mounted in a second light box at the rear of the first light box, a printed circuit board, on which is mounted the source of illumination, being provided at the rear of the second pointer. Only one printed circuit board is provided.

The two pointers are rotated by two concentric drive shafts and rotated by a single motor mounted on the printed circuit board.

The second pointer comprises an arm, of which the first end comprises a hub for receiving its drive shaft and the second end comprises an angled portion, of which the end is visible at the outer edge of the dial.

The arm of the second pointer comprises, near its first end, at least one inclined face which partially reflects the light emitted by the source of illumination into the arm and partially allows it to pass towards the light pipe, via a cut-out (or slot) made in the first light box.

The light pipe is arranged to diffuse the light produced by the source of illumination, to illuminate the dial, and to allow a part of this light to pass for the illumination of the first pointer.

The indicator may be utilized as a speed indicator on a motor vehicle instrument panel, but the applicant does not intend to limit the scope of its rights to this specific application alone. For example, the indicator can also be a speed indicator for any locomotive vehicle, or indicate some other value such as engine speed.

Figure 1:
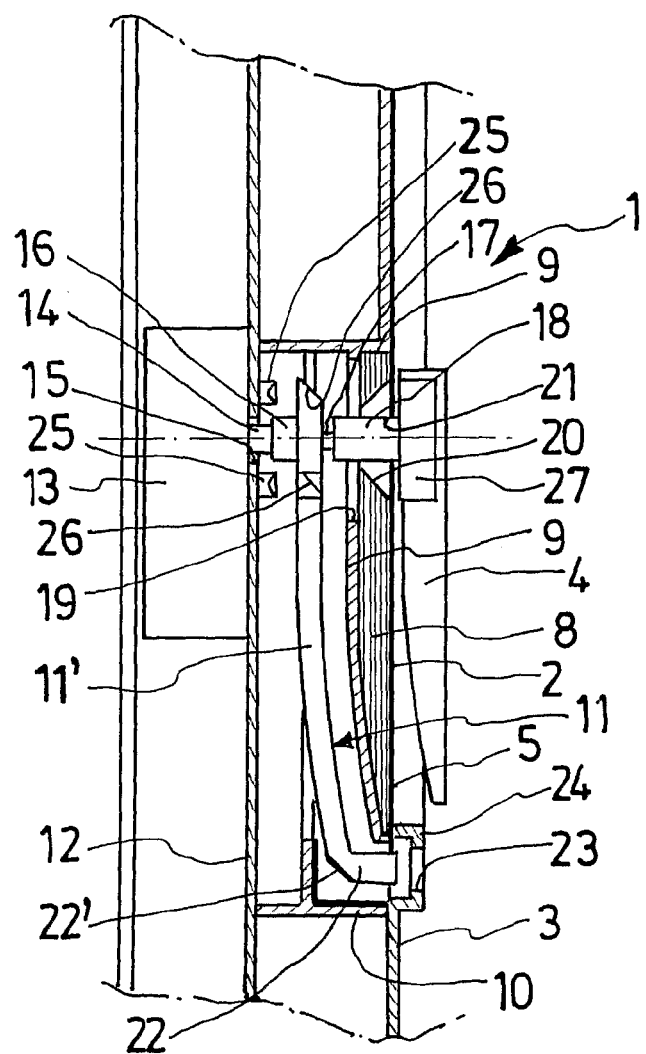
FIG. 1 is a cross-sectional view of a an indicator according to an exemplary embodiment.

With reference to FIG. 1, the speed indicator 1 is a speed indicator for the instrument panel of a motor vehicle. It is part of a group of indicators contained in the instrument panel, which includes a protective window held in place by a hood (not illustrated). The hood also serves as a cover for the indicators. It comprises a part forming a channel essentially transverse to the protective window, extending towards the rear and providing the connection with a dial plate 2 and support for the indicator dials. It includes another part, called the frame, or front panel 3, covering the dial plate 2 outside the indicators; the front panel 3 forms a sort of mask through which only the indicators can be seen, via the cut-outs provided for their positions.

Figure 2:
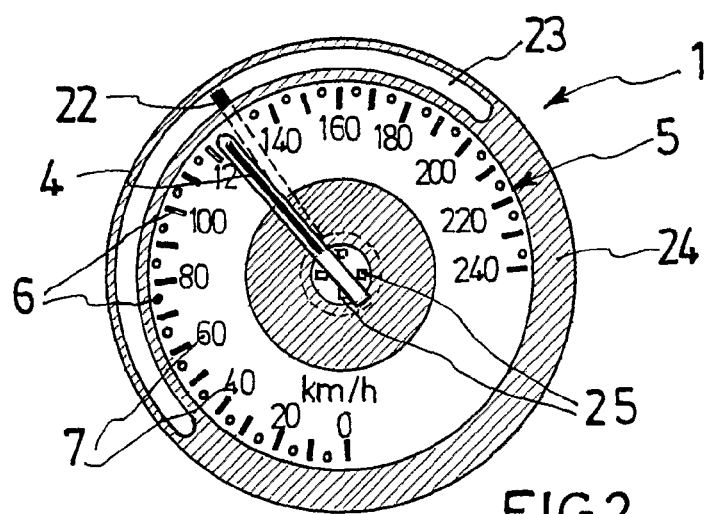
FIG. 2 is a front view of an indicator according to the exemplary embodiment of FIG. 1.

The indicator 1 comprises a first pointer 4, indicating the actual speed of the vehicle, essentially rectilinear in shape, mounted such that it can rotate in front of the dial plate 2, this dial plate carrying printed reading marks forming a speed dial 5. With reference to FIG. 2, the reading marks here include graduations 6, forming a speed measuring scale, distributed in an arc of a circle on the dial plate 2, and numbers 7, assigning speed values to the graduations 6. The dial 5 is graduated from 0 km/h to 240 km/h. Graduations 6 are printed every 5 km/h and figures every 20 km/h. The arc of a circle on which the graduations 6 are carried forms three-quarters of a circle.

A lens 8, forming a light pipe, is mounted at the rear of the dial plate 2. The lens 8 is in the shape of a portion of a disk, of which the outer edge follows the contour of the arc of a circle described by the graduations 6 on the dial 5, the quarter-disk of the dial plate 2, which is the non-graduated portion of the dial 5, are supported by a single opaque wall. The lens 8 is mounted in a first light box 9. At the rear of this first light box 9, behind its back wall, a second pointer 11 is mounted such that it can rotate in a second light box 10. This second light box 10 forms a cavity underneath the graduated three-quarter disk of the dial 5.

It should be understood that "front" and "rear" mean in the direction of the driver and in the opposite direction, respectively with reference to the instrument panel. However, a person of ordinary skill in the art will understand that the present indicator is not limited to a single orientation with respect to the vehicle instrument cluster.

Behind the second pointer 11, is a printed circuit board 12, parallel with the dial plate 2, which controls and feeds the indicator 1, in the case under consideration the group of indicators on the instrument panel of the vehicle. At the rear of this printed circuit board 12 is mounted a drive motor 13 for the pointers 4, 11, which includes a shaft 14, hereinafter called second shaft 14, passing through the printed circuit board 12 towards the front via a cut-out 15 provided for this purpose, perpendicularly to the board 12, and fitted into a hub 16 of the second pointer 11, located at a first end of this pointer 11.

The drive motor 13 includes another shaft 17, hereinafter called first shaft 17, lying concentrically with the second shaft 14, which passes through the second pointer 11 in order to be fitted into a hub 18 of the first pointer 4, this second shaft passing through the back wall of the first light box 9, the lens 8 and the dial plate 2, via the cut-outs 19, 20, 21, respectively, provided for this purpose. The hub 18 of the first pointer 4 is connected to a first end of the first pointer 4, to which it is essentially perpendicular, the second end of this pointer 4 indicating values on the dial 5.

The two shafts 14, 17, are rotated independently of each other by the motor 13, in order to allow the first pointer 4 to indicate the actual speed values of the vehicle, and the second pointer 11 to indicate the reference speed value.

The second pointer 11 includes, from its first end, an arm 11', which includes, at its second end, an angled portion 22, of which the end lies generally perpendicular to the dial plate 2. The arm 11' lies at the rear of the first light box 9, essentially parallel with the dial plate 2, slightly curved towards the front, from its first end as far as its second end, to follow, offset in relation to it, the convex shape of the lens 8, as far as its outer edge, beyond which the pointer 11 comprises its angled portion 22.

The end of the angled portion 22 of the second pointer 11 is visible to the driver of the vehicle by means of an arc of circle cut-out 23 made in the front panel 3. The front panel 3 comprises, around the dial 5, an annular portion 24, raised in relation to the dial plate 2, which surrounds the dial 5, for aesthetic reasons. The cut-out 23 is cut through along this annular portion 24. This cut-out 23 forms here a semicircle located angularly between 40 km/h and 200 km/h on the dial 5. A reference speed, between these speeds, can be indicated by the position of the end of the angled portion 22 of the second pointer 11 in the cut-out 23, in a way that is visible to the driver.

On the front side of the printed circuit board 12, around its cut-out 15 for the shafts 14, 17 of the drive motor 13 to pass through, is mounted a source of illumination consisting of a series of LEDs 25, here four in number. These LEDs 25 are arranged so that, when switched on, they illuminate simultaneously the end of the angled portion 22 of the second pointer 11, the dial 5 and the first pointer 4.

The second pointer 11 comprises a transparent light-transmitting material. The LEDs 25 being located at the rear of the second light box 10, directly illuminate the second pointer 11, of which the arm 11' comprises, at its first end, which is located near the LEDs 25, inclined faces 26 which partially reflect the light emitted by the LEDs 25 into the arm 11' of the pointer 11 in the direction of its second end. The pointer 11 being light-transmitting, the light is guided as far as its angled portion 22, which also comprises a face 22' reflecting the light towards its end; the end of the angled portion 22 of the second pointer 11 is therefore luminous, when the LEDs 25 are switched on, for the driver who can see it via the cut-out 23 in the front panel 3. The four LEDs 25 being regularly spaced, in diametrically opposed pairs, the second pointer 11 is sufficiently thick to receive uniform illumination from the LEDs 25 irrespective of its angular position.

In addition, the cut-out 19, at the back of the first light box 9, for the hub 18 of the first pointer 4 to pass through, is widened in order to allow a part of the light emitted by the LEDs 25 to pass into the lens 8. The light emitted by the LEDs 25 spreads towards this cut-out 19, directly and/or through the second pointer 11, which is transparent, the light spreading through this pointer 11 being, as mentioned above, partially reflected by the inclined faces 26 (or reflective surfaces) and guided into its arm 11', partially transmitted towards the lens 8. The dial 5 is therefore illuminated by the light diffused through the lens 8 while at the same time being contained by the first light box 9. The dial plate 2 is translucent and opaquely printed, the graduations 6 and the numbers 7 being outlined in ink or printed with translucent ink. Therefore, the graduations 6 and the numbers 7 can be seen by day, because they are not in the same colour as the opaque ink printed on the dial plate 2, and by night, when the LEDs 25 are switched on, because they are then illuminated from the rear and by the light of the LEDs 25 shining through, via the lens 8.

The cut-out 20, in the lens 8, for the hub 18 of the first pointer 4 to pass through, is tapered, with its small diameter on the rear side. The light which passes through the cut-out 19 in the back of the first light box 9 is reflected by the inclined face of the tapered cut-out 20 into the lens 8 to be diffused by the lens thereby illuminating the dial 5 and transmitting light towards the front in the direction of the first pointer 4. This pointer 4 has, straight ahead of the tapered cut-out 20, a boss 27, which collects the light coming from the tapered cut-out 20 and guides it into the long body of the pointer 4. The body of the pointer 4 comprises a translucent light-transmitting material, and is therefore illuminated.

A dial speed indicator 1 is obtained which comprises a pointer 11 indicating a reference speed, driven by a motor 13 and is therefore accurate as to the speed reading, which is compact and inexpensive. Only one printed circuit board 12 is required, comprising a source of illumination 25 which simultaneously illuminates the visible portion of the pointer 11 indicating a reference speed, the dial 5 and the pointer 4 indicating the actual speed of the vehicle.

The dial 5 could be arranged differently, for example illuminated over the whole of its surface, with the reading marks 6, 7, opaquely printed, displayed by backlighting.

The drive motor 13 has been disclosed as a single motor with two coaxial shafts 14, 17, but two motors could be provided with two offset shafts, or a single motor with two offset shafts, the various reading paths being adapted to this configuration; with a minimum offset, it is even possible to have the impression that the pointers have the same center of rotation, for example by using a second pointer of which the thickness is greater than that of the cut-out through which it can be seen, meaning that one does not realize that one is in fact not seeing the same part of this pointer as it gradually rotates.

The invention claimed is:

1. A speed indicator, comprising:
   a dial plate supporting a dial;
   a first pointer indicating the actual speed, rotated in front of the dial;
   a second pointer indicating a reference speed, rotated behind the dial and including an end portion visible at the outer edge of the dial; and
   means for illuminating the first and second pointers and the dial;
   wherein the means for illuminating comprises a single source of illumination common to the first pointer, the second pointer and the dial;
   wherein the dial plate is mounted on a light pipe and mounted in a first light box, and wherein the first pointer is light-transmitting, the second pointer is light-transmitting, and mounted in a second light box at the rear of the first light box; and
   a printed circuit board, on which is mounted the source of illumination, being provided at the rear of the second pointer.

2. The speed indicator of claim 1, wherein the first and second pointers are rotated by two concentric drive shafts and rotated by a single motor mounted on the printed circuit board.

3. The speed indicator of claim 2, wherein the second pointer comprises an arm, of which the first end comprises a hub for receiving its drive shaft and the second end comprises an angled portion, of which the end is visible at the outer edge of the dial.

4. The speed indicator of claim 3, wherein the arm of the second pointer comprises, near its first end, at least one inclined face which partially reflects the light emitted by the source of illumination into the arm and partially allows it to pass towards the light pipe, via a cut-out made in the first light box.

5. The speed indicator of claim 4, wherein the light pipe is arranged to diffuse the light produced by the source of illumination, to illuminate the dial, and to allow a part of this light to pass for the illumination of the first pointer.

6. The speed indicator of claim 5, wherein the light pipe comprises a convex light-transmitting lens, including a tapered cut-out for diffusing a part of the light emitted by the source of illumination into the lens, and allowing a part of this light to pass towards the first pointer.

7. The speed indicator of claim 6, wherein the source of illumination comprises at least one light-emitting diode.

8. The speed indicator of claim 7, wherein the speed indicator is for an instrument panel of a motor vehicle.

9. The speed indicator of claim 1, wherein the second pointer comprises an arm, of which the first end comprises a hub for receiving its drive shaft and the second end comprises an angled portion, of which the end is visible at the outer edge of the dial.

10. The speed indicator of claim 1, wherein the source of illumination comprises at least one light-emitting diode.

11. The speed indicator of claim 1, wherein the speed indicator is for an instrument panel of a motor vehicle.

12. A speed indicator, comprising:
    a dial plate supporting a dial;
    a first pointer indicating a first speed, wherein the first pointer is configured to rotate in front of the dial;
    a second pointer indicating a second speed, wherein the second pointer is configured to rotate behind the dial and wherein the second pointer includes an end portion visible at the outer edge of the dial; and
    a light source configured to illuminate the first pointer, second pointer and the dial;
    wherein the dial plate is mounted on a light pipe in a first light box;
    wherein the first pointer is illuminable, the second pointer is illuminable, and mounted in a second light box at the rear of the first light box; and
    a control circuit to which the light source is mounted is provided at the rear of the second pointer.

13. The speed indicator of claim 12, wherein the first and second pointers are rotated by two concentric drive shafts attached to a single motor, governed by the control circuit.

14. The speed indicator of claim 13, wherein the second pointer comprises an arm, of which the first end comprises a hub for receiving its drive shaft and the second end comprises an angled portion, of which the end is visible at the outer edge of the dial.

15. The speed indicator of claim 14, wherein the arm of the second pointer comprises at least one inclined face which at least partially reflects the light into the arm and at least partially allows it to pass towards the light pipe, via a cut-out made in the first light box.

16. The speed indicator of claim 15, wherein the light pipe is arranged to diffuse light, to illuminate the dial, and to at least partially illuminate the first pointer.

17. The speed indicator of claim 16, wherein the light pipe comprises a convex light-transmitting lens, including a tapered cut-out for diffusing a part of the light emitted by the source of illumination into the lens, and allowing a part of this light to pass towards the first pointer.

18. An indicator for a vehicle instrument cluster, comprising:
   an electric motor;
   a plurality of pointers concentrically mounted with respect to the instrument cluster;
   a plurality of drive shafts connecting the pointers to the electric motor;
   a dial mounted between at least two pointers in the plurality of pointers;
   a first light box attached to the dial and configured to at least partially conceal light in at least one pointer; and
   a light source configured to provide light to the plurality of pointers;
   wherein one pointer has a radius that is longer than a radius of the another pointer and a radius of the dial, and wherein the one pointer is mounted behind the dial so that the one pointer is at least partially concealed behind the dial;
   wherein the indicator shows vehicle speed and wherein one pointer shows the actual vehicle speed and another pointer shows a reference speed;
   wherein the dial is mounted on a light pipe in a first light box;
   wherein the first pointer is illuminable, the second pointer is illuminable, and mounted in a second light box at the rear of the first light box; and
   a control circuit to which the light source is mounted is provided at the rear of the second pointer.

19. The indicator of claim 18, wherein the at least one pointer in the plurality of pointers comprises a reflective surface to guide light from one end of the at least one pointer to a second end of the at least one pointer.

20. The indicator of claim 18, wherein the light source is center-mounted with respect to the dial.

* * * * *